(12) United States Patent
Wolsey

(10) Patent No.: US 12,487,020 B2
(45) Date of Patent: Dec. 2, 2025

(54) PORTABLE COOLING UNIT AND A PORTABLE STORAGE UNIT

(71) Applicant: FRIO UK LIMITED, Pembrokeshire (GB)

(72) Inventor: Christopher Wolsey, Pembrokeshire (GB)

(73) Assignee: FRIO UK LIMITED, Pembrokeshire (GB)

( * ) Notice: Subject to any disclaimer, the term of this patent is extended or adjusted under 35 U.S.C. 154(b) by 79 days.

(21) Appl. No.: 18/474,602

(22) Filed: Sep. 26, 2023

(65) Prior Publication Data

US 2024/0011695 A1 Jan. 11, 2024

Related U.S. Application Data

(63) Continuation of application No. PCT/GB2022/050161, filed on Jan. 20, 2022.

(30) Foreign Application Priority Data

Mar. 26, 2021 (GB) ...................................... 2104346

(51) Int. Cl.
*A61J 1/00* (2023.01)
*A61J 1/16* (2023.01)
*F25D 7/00* (2006.01)

(52) U.S. Cl.
CPC ................. *F25D 7/00* (2013.01); *A61J 1/165* (2013.01); *F25D 2201/1282* (2013.01); *F25D 2331/8014* (2013.01)

(58) Field of Classification Search
CPC ........... A61J 1/165; F25D 3/10; A01N 1/0257
See application file for complete search history.

(56) References Cited

U.S. PATENT DOCUMENTS 6,067,803 A * 5/2000 Wolsey ................... A61J 1/165
383/4
6,474,100 B1 * 11/2002 Smith ..................... F25B 17/08
62/480

(Continued)

FOREIGN PATENT DOCUMENTS

FR 2832133 5/2003
JP 2012116553 6/2012

OTHER PUBLICATIONS

International Search Report and Written Opinion of the International Searching Authority for PCT/GB2022/050161, Apr. 29, 2022, 8 pages.

*Primary Examiner* — Brian M King
(74) *Attorney, Agent, or Firm* — Heslin Rothenberg Farley & Mesiti P.C.

(57) ABSTRACT

A portable cooling unit for cooling and insulating a vessel. The unit has a thermally insulating envelope that includes a breathable reflective layer, a breathable waterproof layer and an opening for accessing the vessel. A cooling envelope that is arranged to cool and house the thermally insulating envelope and the vessel. The cooling envelope has two water-permeable layers and an opening for accessing the vessel. The unit further has a housing envelope that is arranged to house the vessel, the cooling envelope and the thermally insulating envelope. The housing envelope includes an opening for accessing the vessel and a breathable water-permeable layer that allows moisture to cross the envelope. The two water-permeable layers of the cooling layer are arranged to bound an enclosure containing an absorbent and moisture-wicking material that is arranged to cool the vessel via evaporation of water.

26 Claims, 2 Drawing Sheets

(56) References Cited

U.S. PATENT DOCUMENTS

| | | | |
|---|---|---|---|
| 2004/0007553 | A1 | 1/2004 | Smolko et al. |
| 2015/0053086 | A1* | 2/2015 | Rebouillat ............... B32B 5/26 96/11 |
| 2015/0362244 | A1* | 12/2015 | Sporre ...................... F25D 3/08 62/457.4 |
| 2017/0253409 | A1* | 9/2017 | Owens ............... B65D 81/3834 |
| 2019/0175448 | A1* | 6/2019 | Obrad .................... B65D 81/03 |
| 2019/0376279 | A1* | 12/2019 | Pollack ................ E04D 13/176 |
| 2020/0230912 | A1* | 7/2020 | Conway ........... G06K 19/07758 |
| 2021/0379579 | A1* | 12/2021 | Shanmugavelayudam ................. B65D 81/3484 |

* cited by examiner

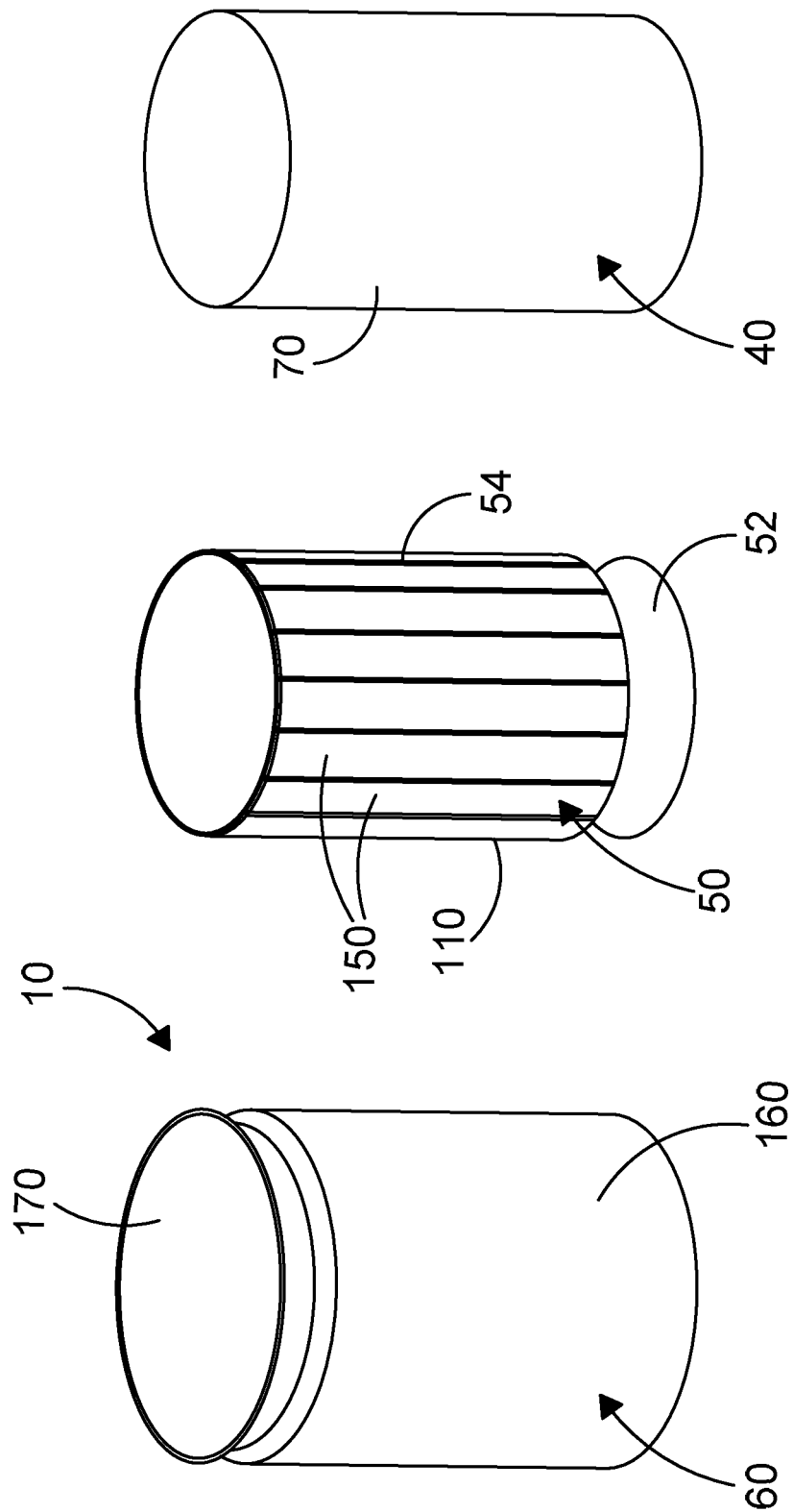

PORTABLE COOLING UNIT AND A PORTABLE STORAGE UNIT

CROSS REFERENCE TO RELATED APPLICATIONS

This continuation application claims priority benefit from International Application No. PCT/GB2022/050161 filed on Jan. 20, 2022, which claimed priority from Great Britain Application No. 2104346.8 filed Mar. 26, 2021, which are incorporated herein by reference in their entireties.

FIELD OF THE INVENTION

The present invention relates to a portable cooling unit for cooling and insulating a vessel containing packages, bottles or bags of blood, blood plasma and medication during transit, and a portable storage unit comprising the portable cooling unit and a vessel.

BACKGROUND OF THE INVENTION

Many different types of medical products used to treat patients need to be kept at specific temperatures that are below or above ambient temperatures. As such, they cooled or refrigerated prior to being administered. For example, the medical products may include medications, such as insulin and vaccines, and blood products, such as blood for transfusions, or blood plasma. Typically, the medical products are kept cooled and insulated from ambient temperatures by electrically powered refrigeration or cool boxes containing cold items that have been refrigerated or frozen.

Electrically powered refrigeration is preferred for the storage of medical products, as it actively cools its interior and the contents stored therein. However, electrically powered refrigeration has the significant drawback that it requires an adequate and reliable power supply to produce any cooling effect. In remote, outlying or less developed areas supplying sufficient and reliable power may not be achievable or viable and this is particularly true during transit. As such, electrically powered refrigeration can often not be relied upon in such areas for the transportation of temperature-sensitive medical products.

Often, cool boxes are used in transportation of temperature-sensitive medical products in remote, outlying or less developed areas as they do not require a constant power supply. However, cool boxes have the drawback of not being actively cooled. Thus, during long transits that are often required to reach such areas, the cold items placed within the cool boxes may warm up such that they no longer provide adequate cooling of the cool box and its stored contents. Furthermore, a cool box is typically cooled by items that have been frozen or refrigerated in electrically powered freezers or fridges. In remote, hard-to-reach or outlying areas supplying the power and equipment required to freeze or refrigerate such items prior to transit is often challenging. Additionally, since the cool box is not actively cooled, the contents stored within the cool box may warm up if the cool box is opened up multiple times to dispense the medical products stored within.

Objects and aspects of the present invention seek to alleviate at least these problems with the prior art.

SUMMARY OF THE INVENTION

According to a first aspect of the present invention there is provided a portable cooling unit for cooling and insulating a vessel containing packages, bottles or bags of blood, blood plasma and medication during transit, the portable cooling unit comprising: a thermally insulating envelope that is arranged to house and thermally insulate the vessel, said thermally insulating envelope comprising a breathable reflective layer, a breathable waterproof layer and an opening for accessing the vessel; a cooling envelope that is arranged to cool and house the thermally insulating envelope and the vessel, said cooling envelope comprising two water-permeable layers and an opening for accessing the vessel; and a housing envelope that is arranged to house the vessel, the cooling envelope and the thermally insulating envelope, said housing envelope comprising an opening for accessing the vessel and a breathable water-permeable layer that allows moisture and/or water to cross the envelope; wherein the two water-permeable layers of the cooling layer are arranged to bound an enclosure containing an absorbent and moisture-wicking material, and further wherein the absorbent and moisture-wicking material is arranged to cool the vessel via evaporation of water.

The portable cooling unit achieves its cooling and insulating that is suitable for blood products and medications, even during temperature fluctuations, through the combination and interplay of the thermally insulating envelope, the cooling envelope and the housing envelope. Typically, the medical products need to be kept within of temperature range of 18° to 26° when ambient temperature is in the range of 0° to 42°. The term "envelope" is understood to mean a bag, box, casing, container, pocket, pouch, covering, receptacle, sheath, shell or the like and the term "house" is understood to mean accept, accommodate, retain, hold, store, enclose, encase, sheathe or the like.

The housing envelope comprises a water permeable layer and allows water and/or moisture to cross from its surrounding towards the adjacent cooling envelope. Water and/moisture can also cross the cooling envelope as it comprises two water permeable layers housing the absorbent and moisture-wicking material. The water and/or moisture can then be absorbed by the absorbent and moisture-wicking material in the cooling envelope. Water and/moisture that is absorbed can then evaporate from the absorbent and moisture-wicking material over time and cool the cooling envelope. In turn, the cooling envelope can cool the vessel and its stored medical products. This active cooling of the cooling envelope and vessel is vital in the function of the portable cooling unit and assists in protecting the stored medical products from fluctuations in the ambient temperature.

The active cooling action of this portable cooling unit is provided solely by the evaporation of water from the absorbent and moisture-wicking material. That is, the cooling action is not provided by an electrically powered cooling system. This allows the portable cooling unit to be truly portable and used in remote, outlying or hard-to-reach places as no power supply needs to be transported alongside the portable cooling unit. In use, the active cooling action of this portable cooling unit may be augmented by passive cooling such as providing ice surrounding or within the portable cooling unit. However, this passive cooling is not required to ensure the performance of the portable cooling unit.

Adjacent to the cooling envelope is the thermally insulating envelope. The thermally insulating envelope is located between the cooling envelope and the vessel in use and is cooled by the cooling envelope. The thermally insulating envelope comprises two breathable layers and thus allows the circulation of cooled air from the cooling envelope through the thermally insulating envelope and toward the vessel in use. The thermally insulating envelope comprises a breathable reflective layer that allows the cold air from the cooling envelope to permeate through it and reflects incoming heat and light radiation. Additionally, the thermally insulating envelope comprises a waterproof breathable envelope. The waterproof breathable envelope is arranged to discourage water and/or moisture from the environment or that has been evaporated from the cooling envelope from crossing it towards the vessel. Both of the layers of the thermally insulating envelope act as a thermal shield to protect the vessel housed in use from temperature fluctuations.

The layers of the thermally insulating envelope, cooling envelope and housing envelope may each individually be described as membranes, webs, web membranes, or web members. That is, the layers may be described as membranes as they are selectively permeable, for example, the water permeable layer is arranged to allow water and air to cross but most solid materials cannot cross the layer.

Preferably, the cooling envelope comprises a base section that is arranged to cool a base of the vessel and a sidewall section that is arranged to cool a sidewall of the vessel, and wherein each of said base section and said side section comprise separate enclosures for housing the absorbent and moisture-wicking material. It is preferred that the cooling envelope comprises a base section and a sidewall section as this prevents the absorbent and moisture-wicking material from sagging under gravity in the enclosure and reducing the efficiency of cooling around some parts of the cooling envelope. Additionally, forming the cooling envelope from two sections improves the ease with which it can be manufactured and shaped.

Preferably, the two water-permeable layers of the cooling layer are arranged to bound the enclosure by attaching the two layers together. The term "attaching" together is understood to mean adhering, connecting, bonding, joining, laminating, fastening, fixing, affixing, linking, securing or coupling together. Likewise, the same applies for the other forms of "attaching together", for example, "attached together". Furthermore, it is understood that when the two layers are attached together, they may be directly attached to one, or indirectly attached to one another via a spacer member or intermediate layer. It is preferable that the two water permeable layers are attached together by one method selected from the following techniques: stitches; heat welds; or an adhesive.

Preferably, the cooling envelope comprises at least two water-permeable layers.

Preferably, the two water-permeable layers of the cooling envelope are attached together such that the enclosure comprises multiple, or a plurality of, compartments that each house a portion of the absorbent and moisture-wicking material.

Preferably, the multiple compartments of the enclosure are arranged within the cooling envelope as a set of rows, a set of columns or in a chequered pattern. More preferably, the multiple compartments of the enclosure are arranged with the cooling envelope as a set of columns.

The multiple compartments being arranged as a set of columns should be interpreted as that each of the compartments extends in a direction from the top to the bottom of the cooling envelope and in a direction substantial parallel to one another. For example, when the cooling envelope has a substantially cylindrical profile, the each of the compartments will extend in a direction perpendicular to the planar faces of the cylinder and parallel with the curved sidewalls of the cylinder. Typically, when the multiple compartments are arranged in a set of columns that extend in a direction parallel with the longitudinal axis of the cooling envelope. The multiple compartments being arranged as a set of rows should be interpreted as that each of the compartments extends in a direction around the circumference of the cooling envelope and in a direction substantial parallel direction to one another. Typically, when the multiple compartments are arranged in a set of rows that will extend in a direction perpendicular to the longitudinal axis of the cooling envelope. For example, when the cooling envelope has a substantially cylindrical profile, each of the compartments will be substantially annular or toroidal and substantially parallel with the planar faces of the cylinder.

Preferably, the cooling envelope is shaped or configured to be complementary to the vessel. More preferably, the cooling envelope is shaped or configured to be complementary to the vessel such that, in use, the majority of an inner surface of the cooling envelope and the majority of an outer surface of the vessel abut. More preferably, the cooling envelope is shaped or configured by the attachment between the two water-permeable layers. Namely, the stitches, the heat welds or the adhesive attaching the two water permeable layers are configured to shape the cooling envelope to be complementary to the vessel in use.

Preferably, the two water-permeable layers of the cooling envelope comprise a woven material.

Preferably, the absorbent and moisture-wicking material of the cooling envelope is granular. Preferably, the absorbent and moisture-wicking material of the cooling envelope is a gel. More preferably, the absorbent and moisture-wicking material of the cooling envelope is a granular gel.

Preferably, the opening of the cooling envelope is resealable. More preferably, the opening of the cooling envelope comprises a draw rope or a zip fastening for resealing the opening.

Preferably, the breathable reflective layer of the thermally insulating envelope is arranged to reflect heat outwardly and away from the vessel.

Preferably, the breathable reflective layer is laminated to the breathable waterproof layer.

Preferably, the breathable reflective layer and the breathable waterproof layer of the thermally insulating envelope are attached together by one selected from the range: stitches; heat welds; adhesive.

Preferably, the thermally insulating envelope is shaped or configured to be complementary to the cooling envelope. More preferably, the thermally insulating envelope is shaped or configured to be complementary to the cooling envelope such that, in use, the majority of an inner surface of the thermally insulating envelope and the majority of an outer surface of the cooling envelope abut. More preferably, the thermally insulating envelope is shaped or configured by the attachment between the breathable reflective layer and the breathable waterproof layer. Namely, the stitches, the heat welds or the adhesive attaching the breathable reflective layer and the breathable waterproof layer are configured to shape the thermally insulating envelope to be complementary to the cooling envelope.

Preferably, the breathable waterproof layer of the thermally insulating envelope comprises channels that are arranged to encourage airflow across a face of the breathable waterproof layer.

Preferably, the breathable waterproof layer of the thermally insulating envelope comprises a non-woven material. More preferably, the non-woven material of the breathable waterproof layer is a polymer. Even more preferably, the non-woven material of the breathable waterproof layer is polypropylene.

Preferably, the breathable reflective layer of the thermally insulating envelope comprises a micro perforated foil.

Preferably, the thermally insulating envelope comprises two breathable reflective layers. More preferably, the first of the two breathable reflective layers is arranged to reflect heat outwardly and away the vessel, and further wherein the second of the two breathable reflective layers is arranged to reflect heat inwardly and towards the vessel. The inward and outward directions are relative to the vessel when contained within the portable cooling unit.

Preferably the layers of the thermally insulating envelope are attached together by one selected from the range: stitches, heat welds or adhesive.

Preferably, the thermally insulating envelope comprises a mechanism for reversibly closing its opening. More preferably, the resealable opening of the thermally insulating envelope comprises a draw rope or a zip fastening.

Preferably, the housing envelope comprises a resealable lid for closing its opening.

Preferably, the breathable water-permeable layer of the housing envelope comprises a non-woven material.

According to a second aspect of the present invention, there is provided a portable storage unit for cooling and insulating packages, bottles or bags of blood, blood plasma and medication during transit, said portable storage unit comprising a vessel for storing packages, bottles or bags of blood, blood plasma or medication, said vessel comprising a resealable opening for accessing the contents stored with the vessel, and the portable cooling unit in accordance with the first aspect of the present invention; wherein said vessel is enclosed by said portable cooling unit and accessible by the openings in the thermally insulating envelope; cooling envelope, and the housing envelope.

The portable cooling unit included in the second aspect of the present invention may comprises any of the optional or preferred features of the first aspect of the present invention.

BRIEF DESCRIPTION OF THE DRAWINGS

The accompanying drawings, which are incorporated in and constitute a part of the specification, illustrate embodiments of the disclosure and together with the detailed description herein, serve to explain the principles of the disclosure. The drawings are only for purposes of illustrating preferred embodiments and are not to be construed as limiting the disclosure. It is emphasized that, in accordance with the standard practice in the industry, various features are not drawn to scale. In fact, the dimensions of the various features may be arbitrarily increased or reduced for clarity of discussion. The foregoing and other objects, features and advantages of the disclosure are apparent from the following detailed description taken in conjunction with the accompanying drawings. An embodiment of the present invention will now be described by way of example only and with reference to the accompanying drawings, in which:

FIG. 2 depicts a perspective view of the housing envelope of the portable storage unit of FIG. 1, in accordance with an aspect of the present disclosure;

FIG. 3 depicts a perspective view of the cooling envelope of the portable storage unit of FIG. 1, in accordance with an aspect of the present disclosure; and FIG. 4 depicts a perspective view of the thermally insulating envelope of the portable storage unit of FIG. 1, in accordance with an aspect of the present disclosure.

DETAILED DESCRIPTION OF THE INVENTION

Figure 1:
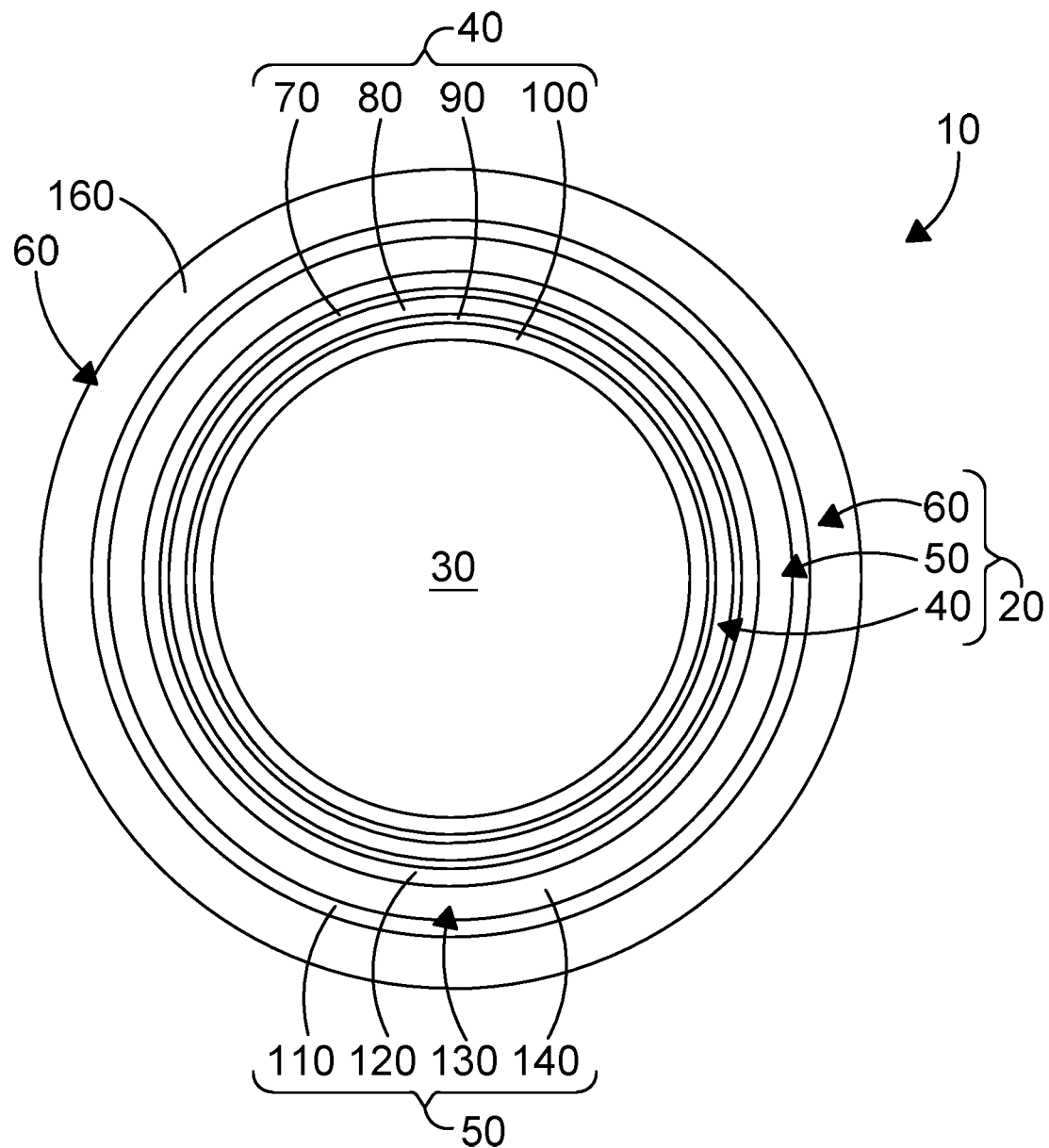
FIG. 1 depicts a schematic cross-section a portable storage unit, in accordance with an aspect of the present disclosure.

FIG. 1 and FIG. 2 of the drawings depicts a portable storage unit 10 in accordance with the present invention. The portable storage unit 10 comprises a portable cooling unit 20 that is arranged to cool and insulate a vessel 30 and FIGS. 3 and 4 depict component parts of the portable cooling unit 20.

The vessel 30 is suitable for storing medical products, such as blood, blood plasma and medications, and is known in the art. The medical products stored within the vessel 30 are typically packaged within plastic or glass bottles, bags, ampoules, or the like.

In this embodiment, the vessel 30 is substantially cylindrical and comprises a resealable opening for accessing the medical products stored within. The resealable opening is located at the one of planar ends of the substantially cylindrical vessel 30.

The portable cooling unit 20 is arranged to cool and insulate the vessel 30 and comprises three envelopes to achieve this function: a thermally insulating envelope 40, a cooling envelope 50 and a housing envelope 60. As can be seen from FIG. 1, both the thermally insulating envelope 40 and the cooling envelope 50 comprise multiple layers to achieve their respective functions as is discussed below.

In the portable storage unit 10, the thermally insulating envelope 40 is adjacent to and surrounds the vessel 30. That is, the thermally insulating envelope 40 is large enough to house the vessel 30 and the thermally insulating envelope 40 is arranged to insulate the vessel 30 by limiting heat from the ambient surroundings warming the vessel 30.

Typically, the thermally insulating envelope 40 is shaped and configured to be complementary to the vessel 30. Or, in other words, the thermally insulating envelope 40 is typically designed and manufactured to be complementary to a certain vessel 30. This helps to ensure good insulation of the vessel 30 by the thermally insulating envelope 40 due to their complementary shape and close proximity.

In this embodiment, the majority of the inner surface of thermally insulating envelope 40 engages and abuts the majority of the outer surface of the vessel 30, as the thermally insulating envelope 40 is substantially cylindrical and complementary to the cylindrical vessel 30. The thermally insulating envelope 40 also comprises an opening at one of its planar ends that allows access to the vessel 30. It is preferable, that the opening can be occluded such that the thermally insulating envelope 40 can be completely bound, enclose or encapsulate the vessel 30 as this is advantageous for insulating the vessel 30. In this embodiment, the opening of the thermally insulating envelope 40 is open. In other embodiments, the opening of the thermally insulating envelope 40 is resealable and such that the opening can be occluded and opened via a draw rope.

The thermally insulating envelope 40 comprises a plurality of layers to provide effective insulation and thermal shielding of the vessel 30. In particular, the thermally insulating envelope 40 comprises a first breathable reflective layer 70 that is attached to a first breathable waterproof layer 80 and a second breathable reflective layer 90 that is attached to a second breathable waterproof layer 100.

Both the first breathable reflective layer 70 and the second breathable reflective layer 90 are micro-perforated foils. The foil aspect of the breathable reflective layers 70, 90 reflects heat radiation and assists in thermally insulating the vessel 30. In particular, the first breathable reflective layer 70 and the second breathable reflective layer 90 are arranged such that they form a two-way reflecting thermal shield. In this embodiment, the first breathable reflective layer 70 is arranged to reflect heat outwardly and away from the vessel 30, and the second breathable reflective layer 90 is arranged to reflect heat inwardly and towards the vessel 30. The micro-perforations in the breathable reflective layers 70, 90 help make them breathable such that air that is cooled by the cooling envelope 50 is allowed to cross the breathable reflective layers 70, 90 and thereby cool the vessel 30.

Each of the breathable reflective layers 70, 90 are attached to their respective breathable waterproof layer 80, 100, and, in this embodiment, the breathable reflective layers 70, 90 are laminated to their respective breathable waterproof layer 80, 100. The laminated first breathable reflective layer 70 and first breathable waterproof layer 90 are then attached to the laminated second breathable reflective layer 80 and second breathable waterproof layer 100 by stitches, welds or an adhesive. The attachment between the four layers 70, 80, 90, 100 of the thermally insulating envelope is used to shape and configure the thermally insulating envelope 40 to be complementary to the vessel 30 as discussed above.

The first breathable waterproof layer 80 and the second breathable waterproof layer 100 are both formed from a non-woven polypropylene layer. This non-woven polypropylene layer is typically a web or web membrane as this renders the non-woven polypropylene as a breathable layer but also one that can be laminated to the breathable reflective layers 70, 90. The waterproof breathable layers 80, 100 discourage water and/or moisture from the environment or that has been evaporated from the cooling envelope 50 from crossing it towards the vessel 30 but allows cool air to circulate. Furthermore, each of the breathable waterproof layers 80,100 comprises channels raised or etched within their surface for encouraging airflow across their surfaces.

In the portable cooling unit 20, the cooling envelope 50 is adjacent to and surrounds the thermally insulating envelope 40. That is, the cooling envelope 50 is large enough to house the thermally insulating envelope 40. The cooling envelope 50 is arranged to cool the thermally insulating envelope 40 and vessel 30 housed within the thermally insulating envelope 40 via the evaporation of water as discussed below.

Typically, the cooling envelope 50 is shaped and configured to be complementary to the thermally insulating envelope 40. Or, in other words, the cooling envelope 50 is typically designed and manufactured to be complementary to a certain thermally insulating envelope 40 and vessel 30. This helps to ensure that the cooling action provided by the cooling envelope 50 is spatially proximate to the thermally insulating envelope 40 and the vessel 30 as the majority of the inner surface of cooling envelope 50 engages and abuts the majority of the outer surface of the thermally insulating envelope 40. In this way, air that is cooled by the cooling envelope 50 is proximate to the vessel 30 and can effectively cool it.

In this embodiment, the cooling envelope 50 is substantially cylindrical such that it is complementary to the cylindrical vessel 30 and cylindrical thermally insulating envelope 40. The cylindrical cooling envelope 50 additionally comprises an opening at one of its planar ends that allows access to the opening in the thermally insulating envelope 40 and the vessel 30. It is preferable, that the opening can be occluded such that the cooling envelope 50 can completely bound, enclose, or encapsulate the thermally insulating envelope 40 and vessel 30, as this is advantageous for cooling the vessel 30. In this embodiment, the opening of the cooling envelope 50 is resealable can be occluded and opened via a draw rope.

The cooling envelope 50 comprises a plurality of layers to provide effective cooling of the vessel 30. In particular, the cooling envelope 50 comprises a first water permeable layer 110 that is attached to a second water-permeable layer 120 to bound an enclosure 130 and the enclosure 130 contains an absorbent and moisture-wicking material 140. The attachment of the first water permeable layer 110 to the second water permeable layer 120 shapes and configures the cooling envelope 50 as discussed above. The first water permeable layer 110 and the second water permeable layer 120 may be attached together by stitches, welds or adhesive to configure the shape of the cooling envelope 50.

In this embodiment, the cooling envelope 50 comprises a base section 52 that is attached to a sidewall section 54 as can be seen in FIG. 3. The base section 52 is located at the opposing end of the cylindrical cooling envelope 50 to its opening and sidewall section 54 extends between the base section 52 and the opening in the cooling envelope 50. Both the base section 52 and the sidewall section 54 comprise the first water permeable layer 110 and the second water-permeable layer 120. The two sections 52, 54 are separate and this separates the enclosure 130 and its contained absorbent and moisture-wicking material 140 into two compartments 150, one in the base section 52 and one in the sidewall section 54.

In this embodiment, the first water permeable layer 110 is attached to the second water-permeable layer 120 in the multiple locations such that the portion of the enclosure 130 located in the sidewall section 54 further comprises a plurality of compartments 150 containing the absorbent and moisture-wicking material 140, as can be seen in FIG. 3. In this embodiment, the plurality of compartments 150 within the sidewall section 54 are a set of columns that extend longitudinally between the two planar faces of the substantially cylindrical cooling envelope 50. Other arrangements of the multiple compartments 150 are envisaged, such as a set of rows or a chequered pattern. Each of the compartments in the plurality of compartments 150 has an air channel located between it that encourages airflow across the surface of the cooling envelope.

Both the first water permeable layer 110 and the second water permeable layer 120 are woven-water-permeable materials, such as a mix of polyester and cotton fabric. The water-permeable aspect of the water permeable layers 110, 120 allows water and/or moisture to cross the layers towards and away from the absorbent and moisture-wicking material 140, such that it can cool the vessel via evaporation.

The absorbent and moisture-wicking material 140 comprises a granular or gel material, such as water-soluble polymers, which can absorb and then evaporate water and/moisture thereby cooling itself, the portable cooling unit 20 and the vessel 30.

In the portable storage unit 10 and the portable cooling unit 20, the cooling envelope 50 is housed within the housing envelope 60.

The shape of the housing envelope 60 is typically configured to be complementary to the cooling envelope 50. Or, in other words, the majority of the inner surface of the housing envelope 60 engages and abuts the majority of the outer surface of the cooling envelope 50. In this embodiment, the housing envelope 60 is substantially cylindrical and larger than the cooling envelope 50. The housing envelope 60 further comprises an opening at one end of the cylinder through which the cooling envelope 50, thermally insulating envelope 40 and vessel 30 can be accessed. The opening of the housing envelope 60 can be occluded by a resealable lid 170 as is known in the art.

The housing envelope 60 comprises a breathable water-permeable layer 160 such as a web of non-woven polypropylene. The main purpose of the housing envelope 60 is to provide a protective housing of the cooling envelope 50, thermally insulating envelope 40 and vessel 30 while simultaneously allow water and/moisture to cross the housing envelope 60 such that it does not impair the functioning of the cooling envelope 50.

Each of the vessel 30, the thermally insulating envelope 40, the cooling envelope 50 and the housing envelope 60 are separate and discrete from the other components. In this way, the vessel 30 can be inserted into and removed from the thermally insulating envelope 40 via an opening in the thermally insulating envelope 40, the thermally insulating envelope 40 can be inserted and removed from the cooling envelope 50 via the opening in the cooling envelope 50, and the cooling envelope 50 can be inserted into and removed from the housing envelope 60 via the opening in the housing envelope 60.

What is claimed is:

1. A portable cooling unit for cooling and insulating a vessel containing packages, bottles or bags of blood, blood plasma and medication during transit, the portable cooling unit comprising:
    a thermally insulating envelope that is arranged to house and thermally insulate the vessel, said thermally insulating envelope comprising a breathable reflective layer, a breathable waterproof layer and an opening for accessing the vessel, wherein the breathable waterproof layer provides a barrier that is impervious to water and vapor crossing the breathable waterproof layer towards the vessel but allows air to circulate therethrough,
    a cooling envelope that is arranged to cool and house the thermally insulating envelope and the vessel, said cooling envelope comprising two water-permeable layers and an opening for accessing the vessel, and
    a housing envelope that is arranged to house the vessel, the cooling envelope and the thermally insulating envelope, said housing envelope comprising an opening for accessing the vessel and a breathable water-permeable layer that allows moisture and/or water to cross the envelope;
    wherein the two water-permeable layers of the cooling layer are arranged to bound an enclosure containing an absorbent and moisture-wicking material, and further, wherein the absorbent and moisture-wicking material is arranged to cool the vessel via evaporation of water.

2. The portable cooling unit of claim 1, wherein the cooling envelope comprises a base section that is arranged to cool a base of the vessel and a sidewall section that is arranged to cool a sidewall of the vessel, and wherein each of said base section and said side section comprise separate enclosures for housing the absorbent and moisture-wicking material.

3. The portable cooling unit of claim 1, wherein the two water-permeable layers of the cooling envelope are attached together such that the enclosure comprises multiple compartments that each house a portion of the absorbent and moisture-wicking material.

4. The portable cooling unit of claim 3, wherein the multiple compartments of the enclosure are arranged within the cooling envelope as a set of rows, a set of columns or in a chequered pattern.

5. The portable cooling unit of claim 1, wherein the two water-permeable layers of the cooling envelope that bound the enclosure are attached together by at least one of stitches, heat welds or an adhesive.

6. The portable cooling unit of claim 1, wherein the two water-permeable layers of the cooling envelope comprise a woven material.

7. The portable cooling unit of claim 1, wherein the absorbent and moisture-wicking material of the cooling envelope is granular.

8. The portable cooling unit of claim 1, wherein the absorbent and moisture-wicking material of the cooling envelope is a gel.

9. The portable cooling unit of claim 1, wherein the opening of the cooling envelope is resealable.

10. The portable cooling unit of claim 9, wherein the resealable opening of the cooling envelope comprises at least one of a draw rope or a zip fastening.

11. The portable cooling unit of claim 1, wherein the breathable reflective layer of the thermally insulating envelope is arranged to reflect heat outwardly and away from the vessel.

12. The portable cooling unit of claim 1, wherein the breathable reflective layer and the breathable waterproof layer of the thermally insulating envelope are attached together by at least one of stitches, or heat welds.

13. The portable cooling unit of claim 1, wherein the breathable waterproof layer of the thermally insulating envelope comprises channels that are arranged to facilitate airflow across a face of the breathable waterproof layer.

14. The portable cooling unit of claim 1, wherein the breathable waterproof layer of the thermally insulating envelope comprises a non-woven material.

15. The portable cooling unit of claim 1, wherein the non-woven material of the breathable waterproof layer is polypropylene.

16. The portable cooling unit of claim 1, wherein the breathable reflective layer of the thermally insulating envelope comprises a micro perforated foil.

17. The portable cooling unit of claim 1, wherein the thermally insulating envelope comprises two breathable reflective layers.

18. The portable cooling unit of claim 17, wherein the first of the two breathable reflective layers is arranged to reflect heat outwardly and away from the vessel, and wherein the second of the two breathable reflective layers is arranged to reflect heat inwardly and towards the vessel.

19. The portable cooling unit of claim 18, wherein the two breathable reflective layers of the thermally insulating envelope are attached together by at least one of stitches, heat welds or an adhesive.

20. The portable cooling unit of claim 1, wherein the opening in the thermally insulating envelope is resealable.

21. The portable cooling unit of claim 1, wherein the resealable opening of the thermally insulating envelope comprises at least one of a draw rope or a zip fastening.

22. The portable cooling unit of claim 1, wherein the housing envelope comprises a resealable lid for closing its opening.

23. The portable cooling unit of claim 1, wherein the breathable water-permeable layer of the housing envelope comprises a non-woven material.

24. The portable cooling unit of claim 23, wherein the non-woven material is polypropylene.

25. A portable storage unit for cooling and insulating packages, bottles or bags of blood, blood plasma and medication during transit, said portable storage unit comprising:

a vessel for storing packages, bottles or bags of blood, blood plasma or medication, said vessel comprising a resealable opening for accessing the contents stored with the vessel, and the portable cooling unit of claim 1, wherein said vessel is enclosed by said portable cooling unit and accessible by the openings in the thermally insulating envelope, the cooling envelope and the housing envelope.

26. The portable cooling unit of claim 1, wherein the thermally insulating envelope comprises:
- a first breathable reflective layer laminated to a first breathable waterproof layer; and
- a second breathable reflective layer laminated to a second breathable waterproof layer;
- wherein the laminated first breathable reflective layer and first breathable waterproof layer are attached to the laminated second breathable reflective layer and second breathable waterproof layer; and
- wherein the first breathable reflective layer is arranged to reflect heat outwardly and away from the vessel, and the second breathable reflective layer is arranged to reflect heat inwardly and towards the vessel.

* * * * *